(12) United States Patent  
Grayson et al.

(10) Patent No.: US 6,571,624 B1  
(45) Date of Patent: Jun. 3, 2003

(54) LOW GRAVITY LIQUID LEVEL SENSOR RAKE

(75) Inventors: Gary D. Grayson, Huntington Beach, CA (US); Jeffrey C. Craddock, Orange, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/006,338

(22) Filed: Dec. 3, 2001

(51) Int. Cl.[7] .............................................. G01F 23/00
(52) U.S. Cl. ...................... 73/290 R; 73/295
(58) Field of Search ........................... 73/290 R, 290 V, 73/291, 293, 295

(56) References Cited

U.S. PATENT DOCUMENTS 4,898,030 A * 2/1990 Yeh .......................... 73/290 B
5,518,140 A * 5/1996 Lenz et al. ................. 220/584
6,305,219 B1 * 10/2001 Bentz et al. ............... 73/290 V
6,431,750 B1 * 8/2002 Haberbusch et al. ........ 374/166

* cited by examiner

Primary Examiner—Hezron Williams
Assistant Examiner—Rodney Frank
(74) Attorney, Agent, or Firm—DiPinto & Shimokaji, PC

(57) ABSTRACT

The low gravity liquid level sensor rake measures the liquid surface height of propellant in a propellant tank used in launch and spacecraft vehicles. The device reduces the tendency of the liquid propellant to adhere to the sensor elements after the bulk liquid level has dropped below a given sensor element thereby reducing the probability of a false liquid level measurement. The liquid level sensor rake has a mast attached internal to a propellant tank with an end attached adjacent the tank outlet. Multiple sensor elements that have an arm and a sensor attached at a free end thereof are attached to the mast at locations selected for sensing the presence or absence of the liquid. The sensor elements when attached to the mast have a generally horizontal arm and a generally vertical sensor.

30 Claims, 3 Drawing Sheets

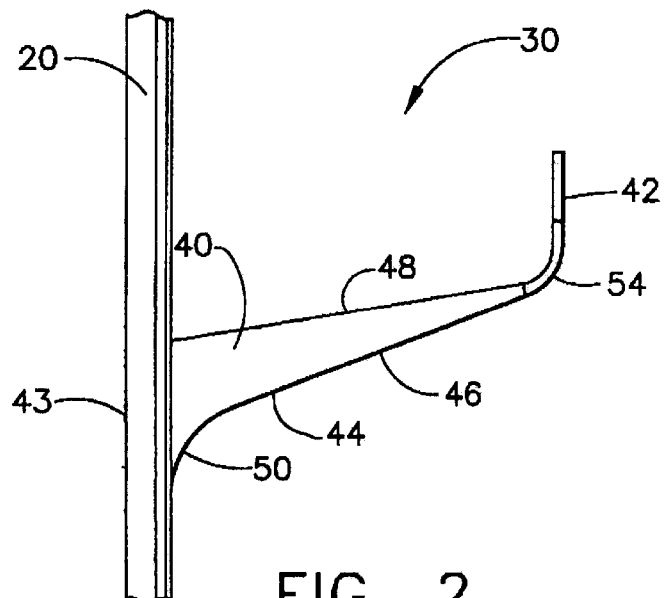
FIG. 2
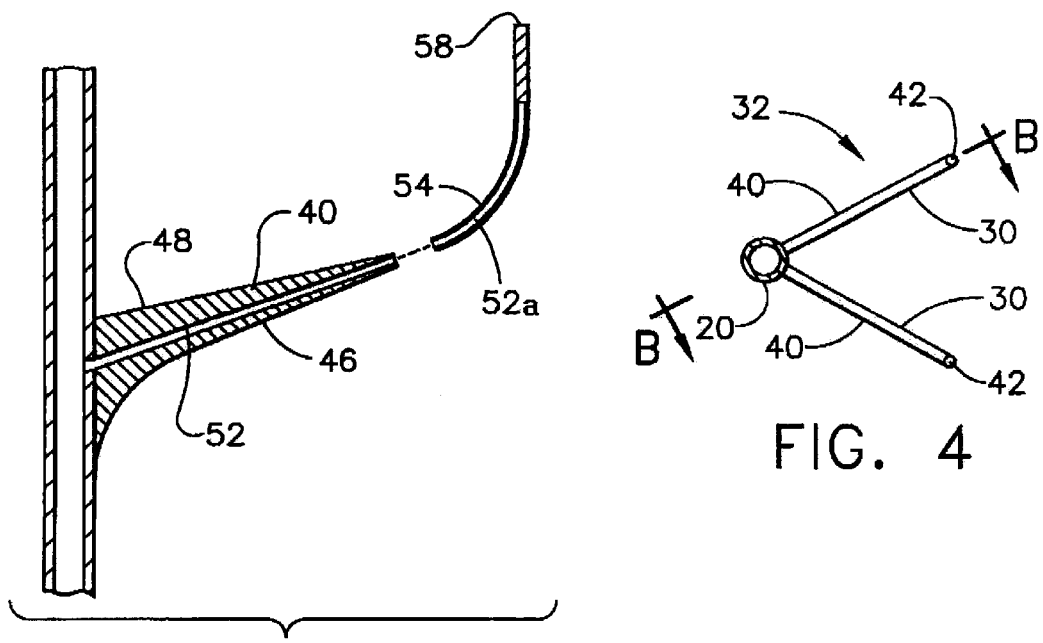
FIG. 3
FIG. 4

LOW GRAVITY LIQUID LEVEL SENSOR RAKE

GOVERNMENT RIGHTS

This invention described herein was made in the performance of work under NASA Contract No. NCC8-190 and is subject to the provisions of Section 305 of the National Aeronautics and Space Act of 1958 (72 Stat. 435: 42 U.S.C. 2457)

BACKGROUND OF THE INVENTION

This invention relates to devices and methods used to measure the amount of liquid mass in a liquid tank used for example in a propellant tank of launch vehicles and spacecraft. The new device structure reduces the tendency of liquid to remain on a liquid sensor due to surface tension during low gravity conditions after the height of the liquid surface has moved below the sensor thereby reducing the likelihood of a false liquid level measurement.

There are currently two primary means for measuring propellant mass in a low gravity condition, as for example, gravity environments of less than 0.1 g. These low gravity conditions may occur during vehicle flight when in space and under reduced vehicle thrust operation such as for low-gravity propellant transfer and depletion dump of propellant. Normally, during powered flight of a vehicle, the gravity sensed by a propellant tank may be above 0.25 g due to acceleration and other factors. However, during low thrust and high altitude conditions a much reduced or low gravity environment may exist for the vehicle propellant tanks.

During a vehicle main engine operation, the acceleration level on a propellant tank may be sufficient such that the fluid physics of the liquid in the tank may be similar to that of normal gravity. Under these conditions, buoyancy may be the dominant force acting upon the fluid and this determines the liquid position within the tank. However, during low gravity vehicle operating conditions, surface tension may cause liquid to remain in locations such as on liquid level sensors after the liquid surface level has been lowered below the sensor tank level location.

One current method for measuring propellant mass in low gravity uses the pressure-volume-temperature (PVT) method equation of state to estimate the volume of gas in the tank. Pressure and temperature are measured to estimate the volume of gas and, using the known propellant tank volume, the liquid volume may be calculated. This method may have significant inaccuracy in liquid mass estimation due to leaks in the system, feed system damage or improper performance as compared to Earth gravity measurements, liquid tank temperature measurements may not be accurately measured, or large temperature gradients existing in the tank.

Another current method of measuring propellant mass in low gravity relies on the calculating or measuring of flow rate of propellant use and then integrating over time to determine the mass of propellant used and thereby the amount of liquid remaining. For this method, commonly known as the bookkeeping method, inaccuracies may result due to difficulty in measuring flow rate accurately, leaks in the system, or large temperature gradients existing in the tank.

In addition, a compression mass gauge liquid tank measurement system may be under development for future use in vehicle propellant tank liquid level measurement. As understood, this apparatus may use a piston incorporated in a liquid tank wall structure. The piston may be cycled for use in determining a tank's pressure response to small volume changes. The apparatus may be complex, involving moving parts, and may be heavy as compared to the present invention thus reducing reliability and increasing vehicle weight, neither of which are desirable for space launch and flight vehicles.

As can be seen, there is a need for a simple, reliable device to measure liquid level in propellant tanks during low gravity environment conditions.

SUMMARY OF THE INVENTION

A propellant tank liquid level sensor rake according to the present invention comprises a mast installed in a tank that may be conformed to the tank curvature and multiple sensor elements attached to the mast. The sensor element comprises an arm having a wicking vane and a sensor.

In one aspect of the present invention, a liquid level sensor rake for measuring propellant liquid surface level in a propellant tank comprises a mast attached to the interior of the tank wherein the mast may be shaped to generally conform to the shape of the tank wall. The mast may be attached at the tank bottom adjacent to the tank outlet and attached to the slosh baffles of the tank side walls. A plurality of sensor elements are attached to the mast and spaced apart one from the other. The sensor elements may have an arm attached to the mast and a sensor attached at the free end of the arm wherein the arm is approximately horizontal relative to the mast and the sensor is approximately vertical thereto.

In another aspect of the present invention, the sensor element may further comprise a vane formed as a portion of the arm wherein the vane is tapered relative to the liquid flow path from the narrow to wider portions of the arm to a bottom edge of the vane. The arm may be attached to the mast at an angle of between about 70 degrees and 90 degrees and the vane may have a bend radius at a vane attachment portion of the bottom edge.

In yet another aspect of the present invention, the sensor element may comprise an arm attachable to a mast wherein the arm is attached at an end at an angle between about 70 degrees and 90 degrees as measured at a top edge relative to the mast. The arm may have a vane that is tapered relative to the liquid flow path from the narrow to wider portions of the arm to a bottom edge and has a bend radius at a vane attachment portion of the bottom edge to form a gradual blend into the mast. A sensor may be attached at a free end of a curved tube that may then be attached to the arm such that the sensor is approximately vertical when the curved tube is attached to the mast.

In a further aspect of the present invention, there is a method for measuring the propellant liquid surface height of a propellant tank comprising the steps of attaching a mast interior and contoured to the shape of a tank; structuring a sensor element to include an arm for attachment to the mast in a generally horizontal orientation; attaching a sensor to the arm at a free end thereof such that the sensor will be approximately vertical when the sensor element is attached to the mast; attaching a plurality of sensor elements to the mast at locations selected for sensing propellant liquid; and monitoring the sensor elements for the presence or absence of propellant liquid.

These and other features, aspects and advantages of the present invention will become better understood with reference to the following drawings, description and claims.

BRIEF DESCRIPTION OF THE DRAWINGS

FIG. 2 illustrates a sensor element according to an embodiment of the invention;

FIG. 3 illustrates a cross section view of a sensor element according to an embodiment of the invention;

FIG. 4 illustrates a top view of a pair of sensor elements according to an embodiment of the invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
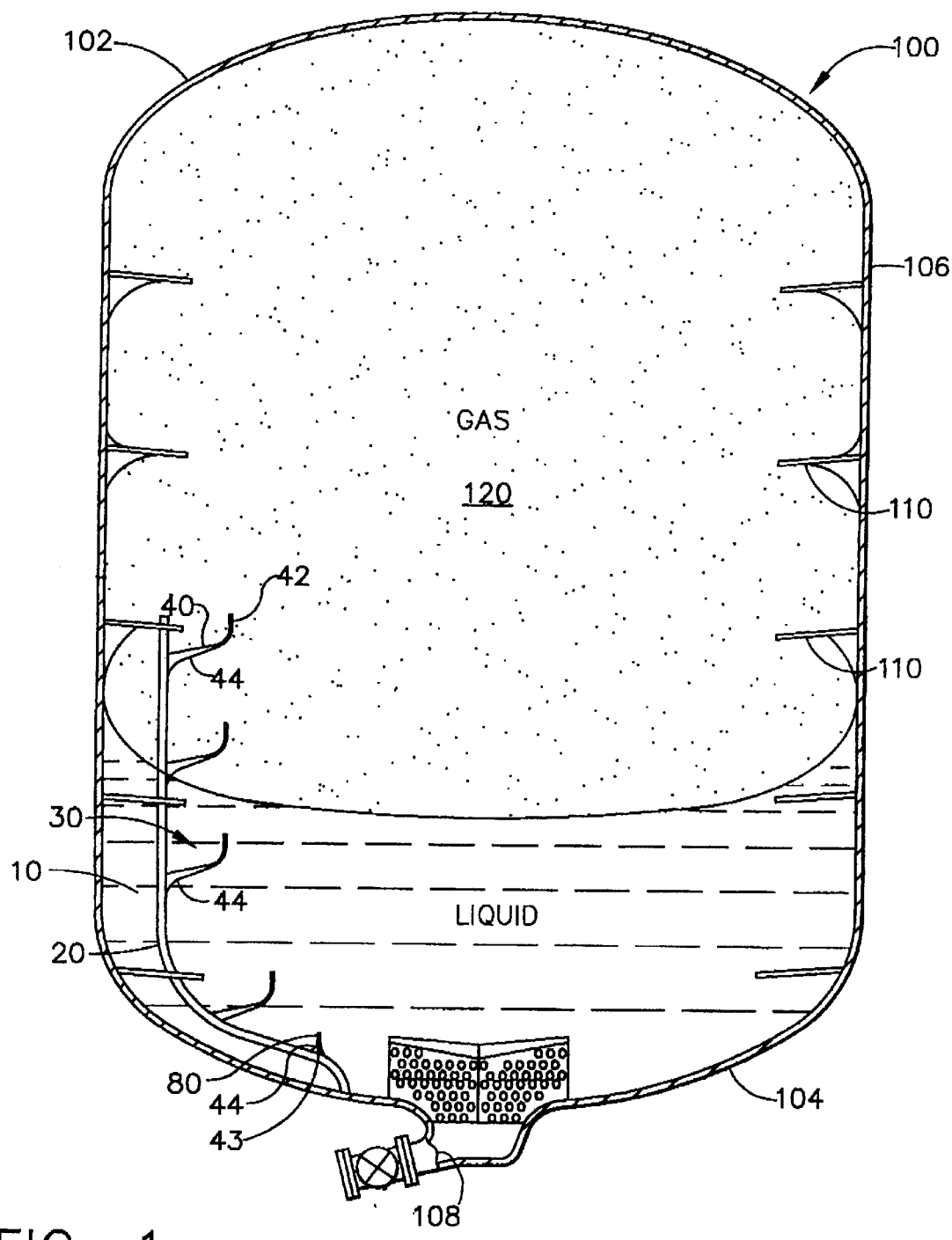
FIG. 1 illustrates a schematic elevation view of a propellant tank with liquid level sensor system according to an embodiment of the invention.

Referring to FIG. 1, a propellant tank liquid level sensor rake 10 device may be used in launch or spacecraft vehicle propellant tanks to determine the height of the propellant's liquid surface from the tank outlet 108. The structure of the liquid level sensor rake 10 device and a sensor element 30 may improve measurement of liquid level in low gravity environments of less than about 0.1 g as well as normal measurement in normal gravity of approximately 1 g and above. The measurement of the liquid surface height may be used to estimate the amount of propellant in a tank 100.

A propellant tank liquid level sensor rake 10 may have a mast 20 constructed to conform to the curvature of a tank wall 102. The mast 20 may be attached to a tank bottom 104 that may be constructed of metal allowing for simple attachment methods and structural support as compared to attachment to a side wall 106 that may be formed of composite materials or metal. The mast 20 may be attached adjacent a tank outlet 108. The mast 20 may be attached adjacent the inside or free edge of circular slosh baffles 110. The conforming of the mast 20 may reduce the probability that the liquid level sensor rake 10 will interfere or trap any gas bubbles 120 in the tank 100 under low gravity conditions. Any such contact may cause an inaccurate liquid level measurement or increase the likelihood of gas ingestion into the fuel feed system.

The mast 20 may have multiple sensor elements 30 attached thereto at locations on the mast 20 determined to be the appropriate liquid surface height measurement position. The sensor elements 30 may be formed of an arm 40 having a sensor 42 attached. The sensor element 30 may have a generally horizontally positioned arm 40 with a generally vertically positioned sensor 42 attached to a first or vertical portion of the mast 20 and a generally vertical sensor element 80 with perpendicularly positioned arm 40 and perpendicularly positioned sensor 42 as illustrated at location 43 on mast 20. The arm 40 may also have a vane 44 tapered underneath the arm 40 to provide a wicking flow path to flow liquid away from the vertical portion of the sensor element 30. The generally vertical sensor element 80 may be attached to the mast 20 at location 43. No extending arm 40 may be required as the sensor element 30 may only have a vertical member. The vertical sensor element 30 may have vanes 44 to aid in wicking off of liquid.

Referring to FIG. 2, the sensor element 30 may have arm 40 with vane 44 portion formed on the underside thereof attached to mast 20. The vane 44 may be tapered relative to the liquid flow path from the sensor 42 to the mast 20 wherein the vane 44 is tapered from the narrow to the wider portions of the arm 40 to a bottom edge 46 to create a relatively narrow or sharp blade form. The bottom edge 46 may be curved radially in a vane attachment portion 50 adjacent to the attachment location on mast 20 to form a gradual blend into the mast 20. A sharp bottom edge 46 at the mast 20 attachment point facilitates the wicking off of any liquid adhering to the arm 40.

A three dimensional fluid dynamics model was used to evaluate the wicking off of fluid from several configurations of sensor elements 30. Of particular note were the results concerning a generally horizontal only sensor as compared to sensor elements that included a vertical sensor 42 portion. In two vertical sensor configurations, one with and one without a vane 44, it was found that the vertical sensor 42 was reasonably free of adhering liquid within 0.4 seconds of the liquid level falling lower than the sensor element 30. The generally horizontal only sensor element still had adhering fluid after 1.0 second of non-submersion.

Referring to FIGS. 2 and 3, the sensor element 30 has a bore 52 in arm 40 and a sensor 42 with an upward curved lower portion 54 for mating with the arm 40. The sensor 42 may have a larger or smaller bend radius and may have a curved lower portion 54 of any length to elevate or lower the sensor tip 58. The curved lower portion 54 may include a bore 52a therethrough.

Referring to FIG. 4, a dual element is illustrated with two sensor elements 30 spaced radially approximately 60 degrees apart. In this embodiment, the presence of liquid may be measured using a thermal dispersion method wherein both sensors 42 may detect the presence of a liquid or gas and hence a sensor 42 wet or dry condition. In this method, one sensor element is heated and thus inputs heat into the surrounding medium. The temperature difference between sensor 42 pairs when immersed in liquid versus in gas is used to indicate presence or absence of liquid. Other known liquid sensors may be used with the sensor element 30 as for example capacitance change between the sensor 42 and the mast 20 in which case pairs of sensors are not used.

Figure 5:
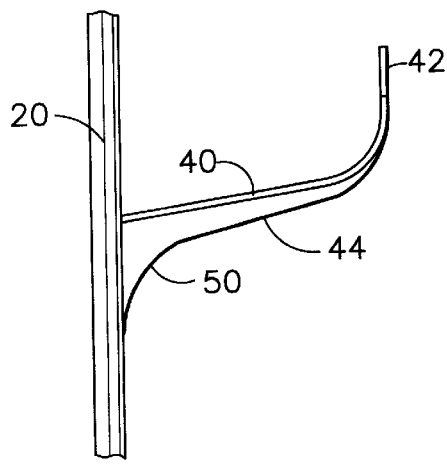
FIG. 5 illustrates an alternate embodiment of the sensor element.
Figure 6:
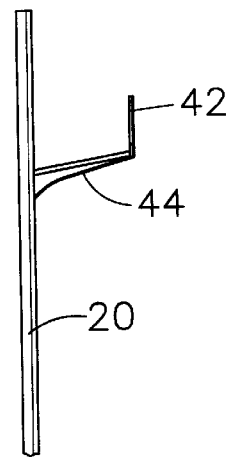
FIG. 6 illustrates another alternate embodiment of the sensor element.
Figures 7, 8, 9:
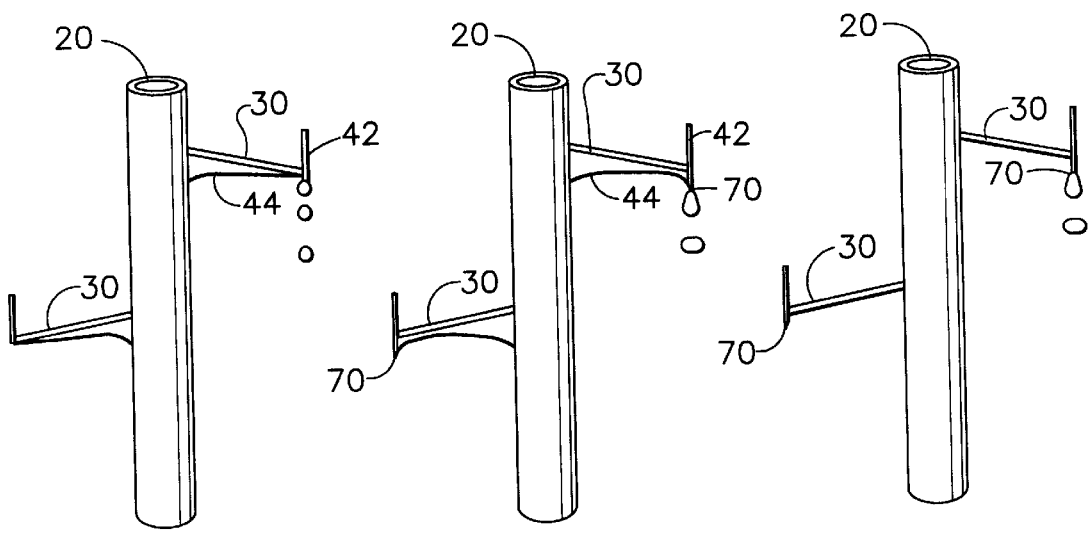
FIG. 7 illustrates yet another alternate embodiment of the sensor element.
FIG. 8 illustrates a further alternate embodiment of the sensor element.
FIG. 9 illustrates yet a further alternate embodiment of the sensor element.

Referring to FIGS. 5 through 9, alternative forms of the sensor element 30 may be used. FIG. 5 illustrates a sensor element 30 wherein the arm 40 is generally circular in cross section and the vane 44 is generally a flat plate. FIG. 6 illustrates an arm 40 with a sensor 42 attached that has no sensor lower portion 54 bend radius. FIGS. 7 and 8 illustrate a generally horizontal arm 40 with a vane 44. In FIG. 8, a pinch off guide 70 is attached to the sensor lower portion 54. The pinch off guide 70 may aid in causing liquid to form droplets that fall off of the sensor element 30. FIG. 9 illustrates a sensor element 30 with a generally horizontal arm 40 and no vane 44.

It should be understood, of course, that the foregoing relates to preferred embodiments of the invention and that modifications may be made without departing from the spirit and scope of the invention as set forth in the following claims.

We claim:

1. A liquid level sensor rake for measuring liquid surface level in a tank, comprising:

a mast attachable to the interior of a tank wherein said mast is attached to a wall of said tank and is shaped to generally conform to said wall curvature;

a plurality of sensor elements attached to said mast and spaced apart one from the other; and at least one of said sensor elements comprises an arm attached at an end to said mast on a generally vertical portion thereof and a sensor attached at a free end of said arm wherein said arm is approximately horizontal and said sensor is approximately vertical.

2. The liquid level sensor rake as in claim 1 wherein at least one of said sensor elements is a vertical sensor element attached to said mast on a generally horizontal portion thereof.

3. The liquid level sensor rake as in claim 1 wherein said arm has a vane.

4. The liquid level sensor rake as in claim 3 wherein said vane is tapered relative to a liquid flow path from a narrow to a wide portion of said arm.

5. The liquid level sensor rake as in claim 1 wherein said arm is attached to said mast at an angle of less than about 90 degrees as measured at a top edge.

6. The liquid level sensor rake as in claim 5 wherein said angle is between about 70 degrees and 90 degrees.

7. The liquid level sensor rake as in claim 1 wherein said arm is attached to said mast approximately orthogonal thereto.

8. The liquid level sensor rake as in claim 4 wherein said vane has a bend radius at a vane attachment portion of a bottom edge.

9. The liquid level sensor rake as in claim 1 wherein said arm has a horizontal bore therein.

10. The liquid level sensor rake as in claim 1 wherein said sensor at a lower portion thereof is curved for attachment to said arm.

11. The liquid level sensor rake as in claim 1 wherein said sensor has a sensor arm portion adjacent said arm and a sensor tip.

12. The liquid level sensor rake as in claim 1 wherein said sensor elements are attached to said mast in pairs and are spaced radially apart.

13. The liquid level sensor rake as in claim 1 wherein said sensor elements have a pinch off guide.

14. The liquid level sensor rake as in claim 1 wherein said mast is attached to a bottom of said tank adjacent to a tank outlet.

15. The liquid level sensor rake as in claim 1 wherein said mast is attached to a slosh baffle in said tank.

16. A sensor element for attachment interior to a tank of launch and spacecraft vehicles, comprising:

an arm at an end thereof attachable in an interior of a propellant tank;

a sensor attached at a free end of said arm wherein said sensor is attached at an angle of less than about 90 degrees to said arm; and said sensor is approximately vertical when said sensor element is attached interiorly to said tank.

17. The sensor element as in claim 16 wherein said arm has a vane.

18. The sensor element as in claim 17 wherein said vane is tapered relative to a liquid flow path from a narrow to a wide portion of said arm.

19. The sensor element as in claim 16 wherein said arm at said end is attached at an angle of less than about 90 degrees as measured at a top edge.

20. The sensor element as in claim 19 wherein said angle is between about 70 degrees and 90 degrees.

21. The sensor element as in claim 16 wherein said arm is attached orthogonal relative to a wall of said propellant tank.

22. The sensor element as in claim 18 wherein said vane has a bend radius at a vane attachment portion of a bottom edge.

23. The sensor element as in claim 16 wherein said arm has a longitudinal bore therein.

24. The sensor element as in claim 16 wherein said sensor at a lower portion thereof is curved for attachment to said arm.

25. The sensor element as in claim 16 wherein said sensor has a sensor arm portion adjacent said arm and a sensor tip.

26. The sensor element as in claim 16 further comprising a pinch off guide.

27. A sensor element for attachment interior to a propellant tank of launch and spacecraft vehicles, comprising:

an arm at an end thereof attachable to a mast wherein said arm at said end is attached at an angle of between about 70 degrees and 90 degrees as measured at a top edge relative to said mast;

said arm having a vane that is tapered relative to a liquid flow path from a narrow to a wide portion of said arm and said vane has a bend radius at a vane attachment portion of a bottom edge;

a sensor attached at a free end of said arm wherein said sensor is approximately vertical when said sensor element is attached to said mast; and said sensor at a lower portion thereof is curved for attachment to said arm.

28. The sensor element as in claim 27 wherein said sensor has a sensor arm portion adjacent said arm and a sensor tip.

29. The sensor element as in claim 27 further comprising a pinch off guide.

30. A method for measuring liquid surface level in a tank, comprising the steps of:

attaching a mast contoured to the shape of a tank interior to said tank;

structuring a sensor element comprising an arm for attachment to the mast in a generally horizontal orientation with a degree of elevation angle relative to the mast;

attaching a sensor to the arm at a free end thereof such that the sensor may be approximately vertical when the sensor element is attached to the mast;

attaching a plurality of sensor elements to the mast at locations selected for sensing the presence of a liquid; and monitoring the sensor elements to detect the presence of propellant contact therewith.

\* \* \* \* \*